United States Patent
Kong

Patent Number: 5,970,123
Date of Patent: Oct. 19, 1999

[54] AUDIO RECORDING INTERFACE CIRCUIT FOR FACSIMILE

[75] Inventor: Tae-Ho Kong, Kyungsangbuk-do, DPR of Korea

[73] Assignee: SamSung Electronics Co., Ltd., Kyungki-do, Rep. of Korea

[21] Appl. No.: 08/921,312

[22] Filed: Aug. 29, 1997

[30] Foreign Application Priority Data

Aug. 30, 1996 [KP] DPR of Korea ............... 96-37160

[51] Int. Cl.[6] ................................ H04M 1/64
[52] U.S. Cl. ...................... 379/67.1; 379/100.16
[58] Field of Search ................ 379/100.15, 100.16, 379/67.1, 88.13

[56] References Cited

U.S. PATENT DOCUMENTS 5,396,544  3/1995  Gilbert et al. ............... 379/67.1
5,422,937  6/1995  Ferrara ....................... 379/67.1

Primary Examiner—Daniel S. Hunter
Attorney, Agent, or Firm—Robert E. Bushnell, Esq.

[57] ABSTRACT

An audio recording interface circuit having a multipurpose audio jack capable of recording voice information received/transmitted by using an external recording device in a facsimile. The audio recording interface circuit in a facsimile system, includes a voice selection unit for user selection of one of a voice signal transmitted/received through a communication path, a voice signal transmitted through a transmission path, and a voice signal received through a reception path and for outputting the selected voice signal, and an audio jack for connecting the selected voice signal with an external recorder.

11 Claims, 1 Drawing Sheet

AUDIO RECORDING INTERFACE CIRCUIT FOR FACSIMILE

CLAIM OF PRIORITY

This application makes reference to, incorporates the same herein, and claims all benefits accruing under 35 U.S.C. §119 from an application for AUDIO RECORDING INTERFACE CIRCUIT FOR FACSIMILE earlier filed in the Korean Industrial Property Office on the 30$^{th}$ of August 1996 and there duly assigned Serial No. 37160/1996.

BACKGROUND OF THE INVENTION

1. Technical Field

The present invention relates generally to an audio recording interface circuit in a facsimile. More particularly, it relates to an audio recording interface circuit having an audio jack for recording many kinds of received/transmitted signals on an external recording apparatus in the facsimile system.

2. Related Art

In general a facsimile has an automatic answering function, and the function allows an automatic answering machine to dispatch a message stored therein in advance to a counterpart in the event that a telephone call comes in during absence of the user. Then, it can convert a message made by the counterpart into digital data so as to store it in a semiconductor memory. Thereafter, a user operates the automatic answering machine upon his return, and reproduces the message made by the counterpart; thereby, a user can listen to the message at that time.

The following patents are considered to be representative of the prior art relative to this application: U.S. Pat. No. 5,461,667 to Remillard, entitled *Apparatus And Method For Electronic Device For Information Services*, U.S. Pat. No. 5,524,137 to Rhee, entitled *Multi-Media Messaging System*, U.S. Pat. No. 5,062,133 to Melrose, entitled *Multi-Function Telephone Call Management System*, U.S. Pat. No. 5,396,536 to Yudkowsky, entitled *Automatic Processing Of Calls With Different Communication Modes In A Telecommunications System*, U.S. Pat. No. 5,056,132 to Coleman et al., entitled *Switch Device Adapted To Interface Between An Incoming Telephone Line And An Internal Telephone System*, U.S. Pat. No. 5,596,628 to Klein, entitled *Method And Apparatus For Initiating Loading Of Software In A Personal Computer In Response To An Incoming Signal*, U.S. Pat. No. 5,414,760 to Hokari, entitled *Exchange For An ISDN Capable Of Controlling An Incoming Call By Kinds Of Communication*, U.S. Pat. No. 5,499,287 to Campbell et al., entitled *Fax-Telephone Interface Circuit*, and U.S. Pat. No. 5,404,400 to Hamilton, entitled *Outcalling Apparatus*.

However, none of the above-mentioned patents discloses an audio recording interface circuit in a facsimile system having a voice selection unit colocated with a facsimile system for local user selection of a voice signal from among various voice signals in combination with an audio jack for providing the selected and outputted voice signal to an external recorder. Moreover, none of the patents discloses an audio recording interface circuit in a facsimile system having a key input unit colocated with a facsimile system and having a transmission voice selection key, a reception voice selection key, and a transmission/reception voice selection key, in combination with a control unit for outputting a voice selection signal for selecting a transmission voice, a reception voice, or a transmission/reception voice, as well as a selection switch responsive to the voice selection signal for selecting one of the possible voice sources and an audio jack for providing the corresponding voice signal from the selection switch to an external recording apparatus.

Moreover, systems of the prior art have been burdened by a disadvantage in that, since the semiconductor memory mounted in the automatic answering machine is a volatile memory, the messages recorded initially may be erased before the user can confirm the messages. Thus, a user may not be able to confirm the messages initially recorded in the event that a plurality of messages are recorded thereon. In addition, there has been another disadvantage with prior art facsimile machines in that one cannot record the communicated contents, the transmitted/received answering messages and facsimile communication signals.

SUMMARY OF THE INVENTION

Accordingly, it is an object of the present invention to provide an audio recording interface circuit, including a multipurpose audio jack capable of recording received/transmitted voice information by using an external recording apparatus in a facsimile system.

It is another object of the present invention to provide an audio recording interface circuit having a multipurpose audio jack capable of recording, by selection of a user, communicated contents, answering messages and received/transmitted signals relative to communication signals on an external recording device.

According to a technical principle for achieving the above objects, the present invention provides an audio recording interface circuit in a facsimile system, including: a voice selection unit for user selection of a signal from among a voice signal transmitted/received through a communication path, a voice signal transmitted through a transmission path, and a voice signal received through a reception path, and for outputting it therefrom; and an audio jack for connecting said selected and outputted voice signal with an external recorder.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENTS

Figure 1:
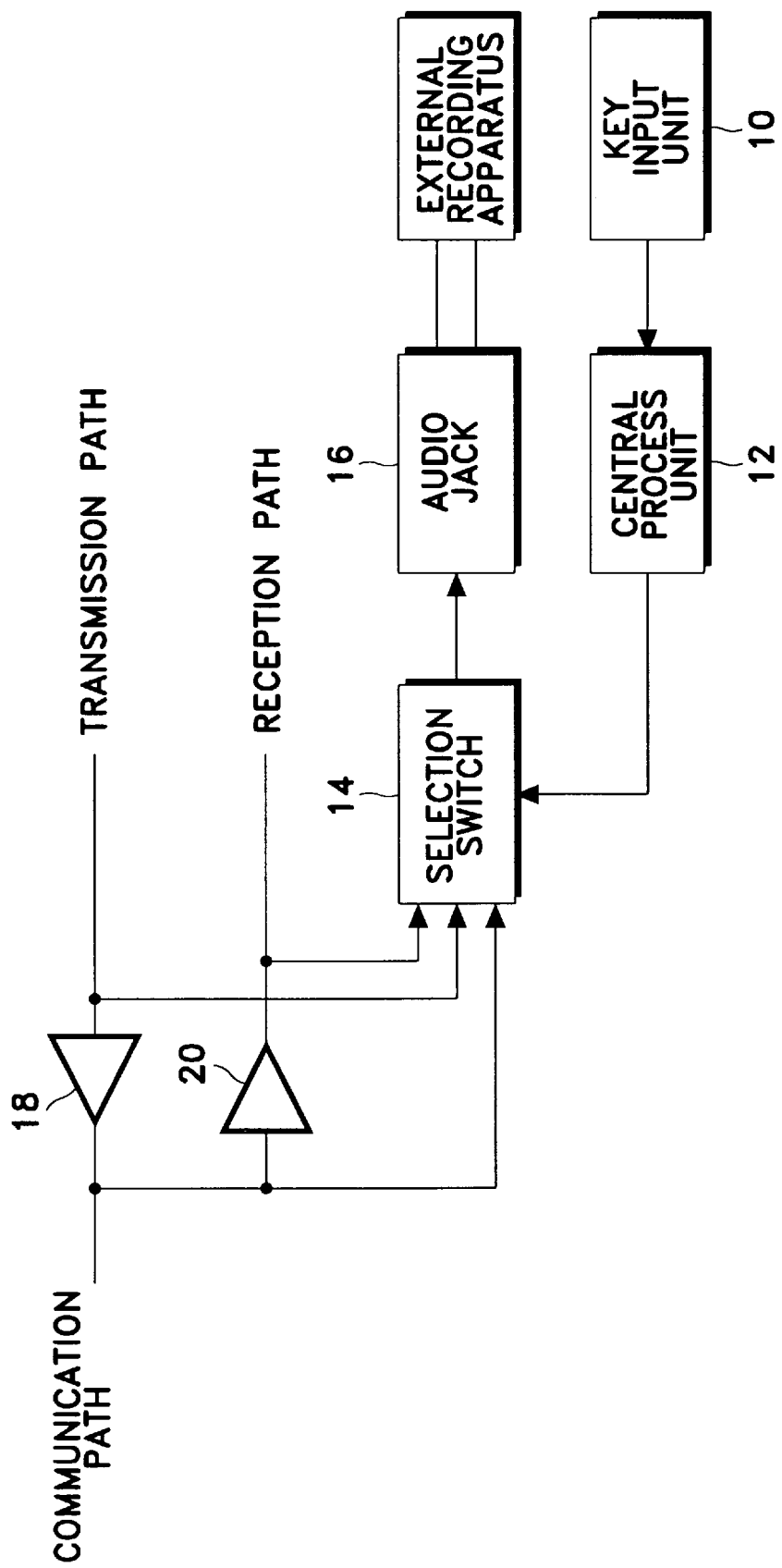
FIG. 1 is a block diagram of a facsimile having a multipurpose audio jack according to an embodiment of the present invention.

Hereinafter, a preferred embodiment of the present invention will be discussed in detail with reference to the accompanying drawings.

It should be noted that like reference numerals are used for like elements although they may be shown in a separate drawing. Further, in the following description, numerous specific details, such as particular components for the specific circuits, are set forth to provide a more thorough understanding of the present invention. It will be apparent, however, to one skilled in the art that the present invention may be practiced without these specific details. Furthermore, the detailed description of known functions and construction details which might unnecessarily obscure the subject matter of the present invention, will be avoided in the following description. Still furthermore, it will be possible to change to the following specific words according to the intention of inventor or practice thereof since it is defined by consideration of its function according to the present invention, and accordingly, it will be understood that the definition should be specified by the entire contents of the present invention.

FIG. 1 is a block diagram of a facsimile having a multipurpose audio jack according to an embodiment of the present invention. A transmission signal amplifier 18 amplifies, by a predetermined level of amplification, an automatic answering transmission message, a transmitted communication voice signal and a transmitted facsimile communication signal, and then outputs the amplified signal therefrom. A reception signal amplifier 20 amplifies, by a predetermined level of amplification, an automatic answering message, a received communication voice signal, and received facsimile communication signals, and then outputs them therefrom. A key input unit 10 includes a transmission voice selection key, a reception voice selection key, and a transmission/reception voice selection key. A central process unit 12 responds to key signals selected and inputted through the key input unit 10 by outputting a voice selection signal for selecting a transmission voice signal, a reception voice signal and a transmission/reception voice signal. A selection switch 14 selects one of the aforementioned signals in response to the voice selection signal outputted from the central process unit 12. The signal selected by the selection switch 12 is then applied to an audio jack 16. Herein, the audio jack 16 is installed in the housing of the facsimile, and thus it can be connected with a recorder 22.

Hereinafter, the operation of outputting the transmission voice signal or reception voice signal to the audio jack 16 and the operation of recording them on an external recording apparatus 22 by selection of the user will be explained with reference to the FIG. 1. In general, the transmission signal amplifier 18 and the reception signal amplifier 20 may be incorporated in a telephone or in a facsimile system. The transmission signal amplifier 18 amplifies the voice signal, the voice information message and the facsimile communication voice signal, and dispatches them through a communication path. At this time, a user should press one of the selection keys—the transmission voice selection key, the reception voice selection key or the transmission/reception voice selection key—in the key input unit 10 to record using an external recorder 22. Herein, the transmission voice selection key is used for recording the transmission voice signal, the reception voice selection key is used for recording the voice signal received from the communication path, and the transmission/reception voice selection key is used for recording the transmitted/received voice signal. Thus, if a user presses the transmission voice selection key in the key input unit 10, the central process unit 12 applies the transmission voice selection signal to the selection switch 14. At this time, the selection switch 14 selects the signal transmitted through the transmission path, such as the automatic answering transmission message, the communication voice signal or the facsimile communication signal, and outputs it to the audio jack 16. Further, if a user presses the reception voice selection key of the key input unit 10, the central process unit 12 applies the reception voice selection signal to the selection switch 14. Then, the selection switch 14 selects the signal received through the reception path, such as the automatic answering reception message, the communication voice signal or the facsimile communication signal, and outputs it to the audio jack 16. Further, if a user presses the transmission/reception voice selection key of the key input unit 10, the central process unit 12 applies the transmission/reception voice selection signal to the selection switch 14. At this time, the selection switch 14 selects the signal transmitted/received through the communication path and outputs it to the audio jack 16. Further, a user can record the transmitted/received signal by connecting a plug coupled to a recorder to the audio jack 16. Herein, the voice selection signal outputted from the central process unit 12 can be outputted as follows: the transmission voice selection signal outputs as "00"; the reception voice selection signal as "01"; the transmission/reception voice selection signal as "11". While the selection switch 14 selects the transmission/reception voice signal by operating the key input unit 10, and then the central process unit 12 outputs the voice selection signal, it is understood that a user can select the signal by operating the switch directly in use of a slide switch, for example.

As stated in the above, the present invention has an advantage in that a user can record the transmitted/received audio signal since the voice signal transmitted/received through the communication path is selected and outputted to the audio jack, and is recorded by connecting the recorder to the audio jack in the facsimile.

While the present invention has been described with reference to a specific embodiment, the description is illustrative of the invention and is not to be constructed as limiting the invention. Various modifications may occur to those skilled in the art without departing from the true spirit and scope of the invention as defined by the appended claims.

What is claimed is:

1. An audio recording interface circuit in a facsimile system, comprising:

a voice selection unit colocated with the facsimile system for selection, by a local user, of a voice signal from among various voice signals including a voice signal transmitted/received through a communication path, a voice signal transmitted through a transmission path, and a voice signal received through a reception path, and for outputting the selected voice signal; and an audio jack for providing the selected and outputted voice signal to a local external recorder.

2. The circuit as claimed in claim 1, wherein said various voice signal include contents of telephone communication, an answering message of an automatic answering machine, and a communication tone in a facsimile system.

3. The circuit as claimed in claim 2, wherein said audio recording interface circuit further comprises a key input unit for selecting a transmission voice, a reception voice and a transmission/reception voice, respectively.

4. The circuit as claimed in claim 3, wherein said key input unit produces a selection output in response to selection of a transmission voice, a reception voice and a transmission/reception voice, and wherein said audio recording interface circuit further comprises processing means connected between said key input unit and said voice selection unit, and responsive to said selection output of said key input unit for generating and providing, to said voice selection unit, a transmission voice selection signal, a reception voice selection signal and a transmission/reception voice signal.

5. The circuit as claimed in claim 1, further comprising audio jack means connected between said voice selection unit and an external recording device for providing, to said external recording device, the voice signal selected by said voice selection unit, whereby to record said voice signal selected by said voice selection unit.

6. The circuit as claimed in claim 1, further comprising transmission amplifying means connected between the transmission path and said voice selection unit for amplifying the voice signal transmitted through said transmission path to said voice selection unit.

7. The circuit as claimed in claim 1, further comprising reception amplifying means connected between the reception path and the voice selection unit for amplifying the voice signal received through the reception path.

8. An audio recording interface circuit in a facsimile system, comprising;
- a key input unit colocated with the facsimile system and having a transmission voice selection key, a reception voice selection key and a transmission/reception voice selection key, and generating a key signal in response to activation of one said keys by a local user;
- a control unit for outputting a voice selection signal which selects one of a transmission voice, a reception voice, and a transmission/reception voice in response to the key signal from said key input unit;
- a selection switch responsive to said voice selection signal from said control unit for selecting one of said transmission voice, said reception voice and said transmission/reception voice, and outputting a corresponding voice signal; and
- an audio jack for providing said corresponding voice signal from said selection switch to an external recording apparatus.

9. The circuit as claimed as claim 8, wherein the corresponding voice signal outputted by said selection switch comprises one of the contents of telephone communication, an answering message of an automatic answering machine, and a communication tone in a facsimile system.

10. The circuit as claimed in claim 8, further comprising transmission amplifying means connected to a transmission path and to said selection switch for amplifying one of a voice signal, a voice information message, and a facsimile communication voice signal for dispatch to a communication path.

11. The circuit as claimed in claim 8, further comprising receiving amplifying means connected to a communication path and to said selection switch for amplifying one of an automatic answering message, a received communication voice signal and a facsimile communication signal prior to dispatch to a reception path.

\* \* \* \* \*